United States Patent
Wang et al.

(10) Patent No.: US 7,602,159 B2
(45) Date of Patent: Oct. 13, 2009

(54) COMMON MODE NOISE REDUCTION USING PARASITIC CAPACITANCE CANCELLATION

(75) Inventors: Shuo Wang, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 214 days.

(21) Appl. No.: 11/678,864

(22) Filed: Feb. 26, 2007

(65) Prior Publication Data
US 2008/0204126 A1 Aug. 28, 2008

(51) Int. Cl.
G05F 1/00 (2006.01)
G05F 1/33 (2006.01)

(52) U.S. Cl. ............... 323/262; 323/222; 323/255; 323/263

(58) Field of Classification Search ......... 323/222, 323/223, 247, 255, 262, 282, 305, 340, 355, 323/232, 263, 343, 344
See application file for complete search history.

(56) References Cited

U.S. PATENT DOCUMENTS

| | | | |
|---|---|---|---|
| 2,148,360 A * | 2/1939 | Lemley | 166/88.1 |
| 5,012,179 A * | 4/1991 | Okumura | 323/355 |
| 5,148,360 A * | 9/1992 | Nguyen | 363/48 |
| 5,932,976 A * | 8/1999 | Maheshwari et al. | 315/291 |
| 6,323,627 B1 * | 11/2001 | Schmiederer et al. | 323/222 |
| 6,486,642 B1 * | 11/2002 | Qian | 323/259 |
| 6,496,083 B1 * | 12/2002 | Kushitani et al. | 333/103 |
| 6,507,174 B1 * | 1/2003 | Qian | 323/222 |
| 6,507,176 B2 * | 1/2003 | Wittenbreder, Jr. | 323/259 |
| 7,355,870 B2 * | 4/2008 | Choi | 363/141 |

* cited by examiner

Primary Examiner—Gary L Laxton
(74) Attorney, Agent, or Firm—Whitham, Curtis, Christofferson & Cook, P.C.

(57) ABSTRACT

A negative capacitance is developed by configuring an inductor as two inversely or opposingly coupled windings having different numbers of turns and connecting a capacitance to a center tap between the two windings. The negative capacitance is developed on the side of the inductor having the winding with the greater number of turns. The negative capacitance so developed may advantageously be used to cancel any capacitance or parasitic capacitance desired for reducing power loss, increasing switching speed or reducing or eliminating common mode noise in a switched circuit such as a switched power converter

11 Claims, 8 Drawing Sheets

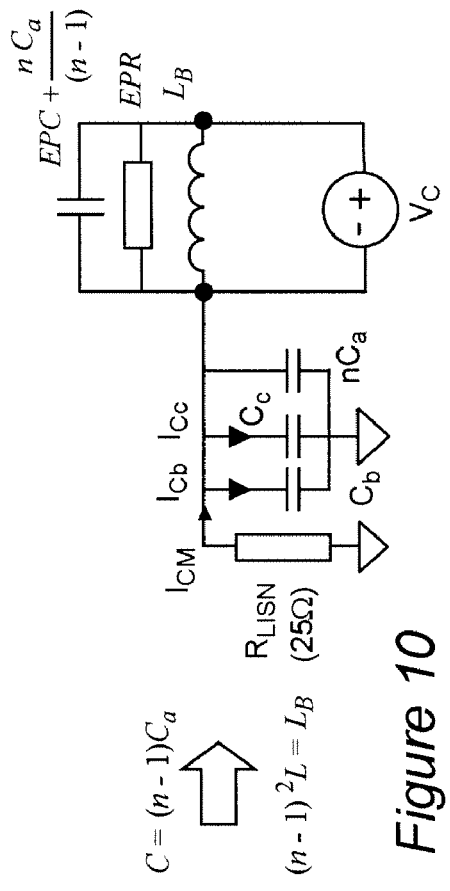
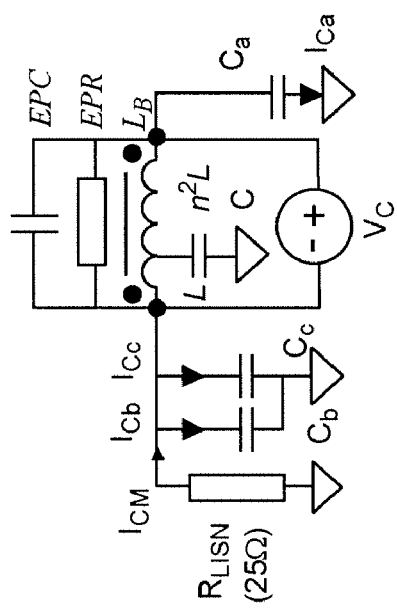
*Figure 10*
*Figure 11*
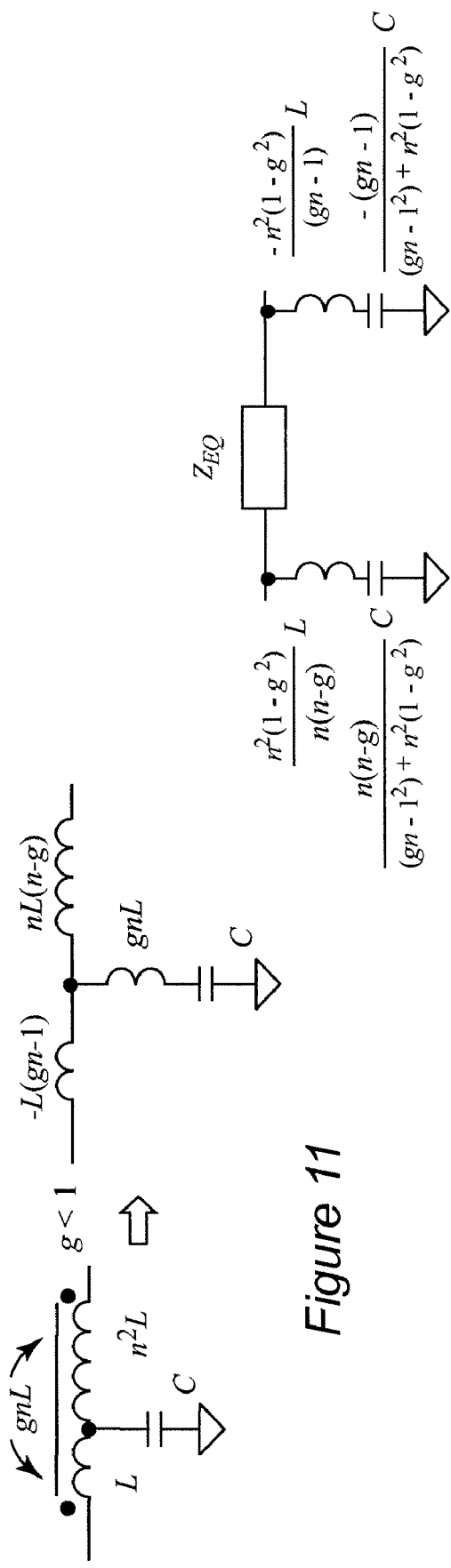
*Figure 12*

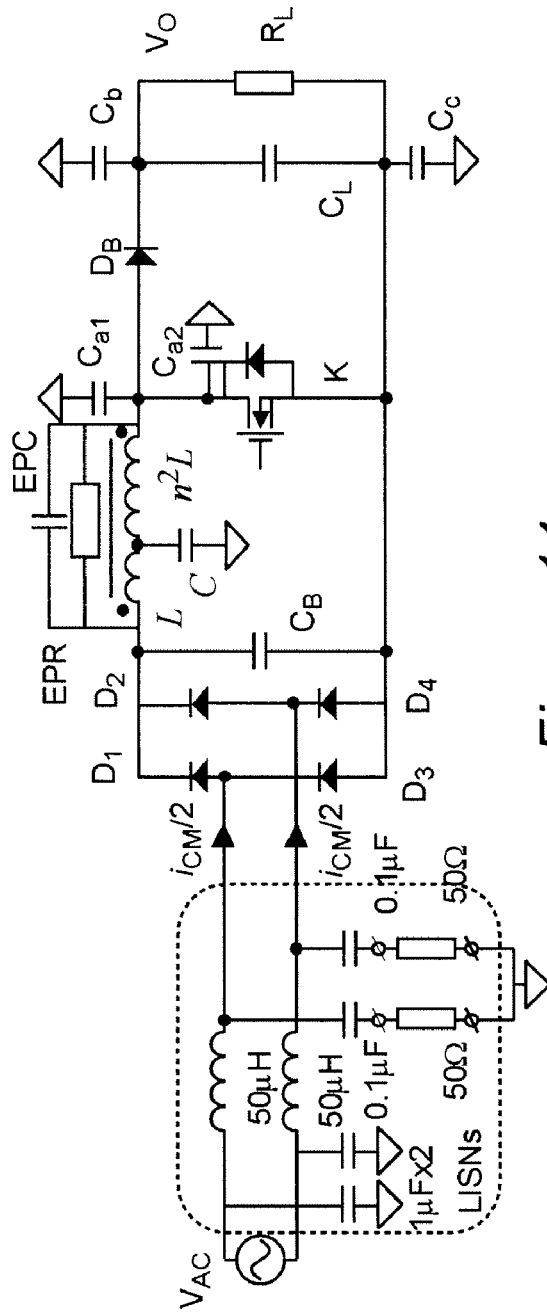
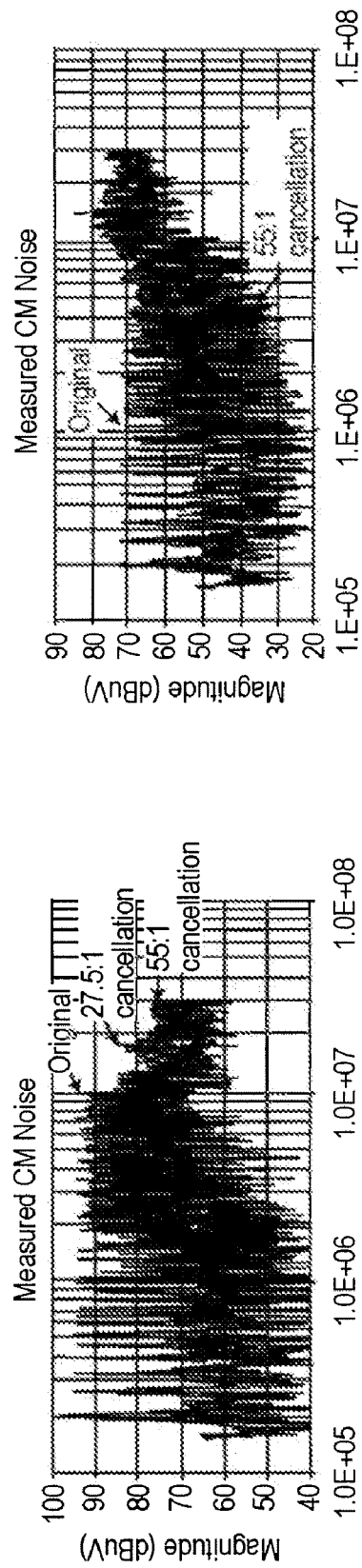
Figure 14
Figure 15A
Figure 16

COMMON MODE NOISE REDUCTION USING PARASITIC CAPACITANCE CANCELLATION

STATEMENT OF GOVERNMENT INTEREST

This invention was made in connection with National Science Foundation Contract Number EEC-9731677. Therefore the U.S. Government may have certain interests in this invention.

BACKGROUND OF THE INVENTION

1. Field of the Invention

The present invention generally relates to electronic power converters and regulators and, more particularly, to switched power converters and reduction of electromagnetic interference noise generated therein.

2. Description of the Prior Art

Virtually all present-day electronic devices use direct current (DC) power initially derived from batteries or alternating current (AC) power distribution networks and, often, a combination thereof such as using rechargeable batteries which may be recharged using AC power. Therefore, power converters, many of which may have a voltage regulation function, are almost universally required to derive a DC voltage appropriate to the circuitry of the device and which, for present and foreseeable designs of microprocessors and the like may be a very low voltage (e.g. 0.8 volts or less) at very high currents (e.g. 150 amperes or more). In general, to improve efficiency, particularly for such voltages and currents, switched power converters and regulators are preferred to analog regulators across which a voltage drop must be established at high current; implying particularly high power dissipation from the regulator.

All switched power converters generate electromagnetic interference (EMI) which may be radiated and/or reflected into the power lines. Therefore the EMI generated must meet standards of the Federal Communications Commission and others.

EMI is composed principally of components referred to as common mode (CM) and differential mode (DM) noise. CM noise is difficult to control since it is caused by the parasitic capacitance between circuits of the power converter and ground. Typically, an EMI filter is used to suppress CM noise since the parasitics cannot be eliminated even though EMI filters are costly, consume significant volume and footprint and power; reducing efficiency of the power converter. Adequacy of EMI filters to suppress CM noise is also marginal, particularly at higher dv/dt on nodes of the power converter circuit resulting from operation at very low voltage output.

Since CM noise is caused by charging and discharging parasitic capacitance and high dv/dt is inevitable in switching power converters, it is desirable for the parasitic capacitances to be as small as possible. However, power devices included in power converters consume power and generate heat which must be dissipated through use of a heat sink. The parasitic capacitance between the heat sink (which may or may not be grounded) and the power devices is thus also inevitable; the noise current flowing from the power devices through the heat sink to ground. This parasitic capacitance is particularly difficult to reduce consistent with providing required heat dissipation.

SUMMARY OF THE INVENTION

It is therefore an object of the present invention to provide a simply implemented and low cost technique and circuit which substantially or fully cancels the parasitic capacitance and thus significantly reduces CM noise and which is applicable to many power converter topologies such as buck, boost, buck-boost, forward, half-bridge, flyback, etc. power conversion topologies of power converters.

It is another object of the present invention to provide a substantial reduction in any required EMI filter circuitry by increasing the corner frequency of the EMI filter design.

In order to accomplish these and other objects of the invention, a circuit for providing a negative capacitance is provided comprising an inductor having first and second inversely coupled windings connected at a center tap and having different numbers of turns, and a capacitor connected to the center tap.

In accordance with another aspect of the invention, a power converter including an inductor and a switch is provided, wherein the inductor includes first and second inversely coupled windings connected at a center tap and having different numbers of turns and a capacitor connected to the center tap; the combination of the inductor and the capacitor being connected for cancellation of parasitic capacitance at a terminal of the switch.

In accordance with a further aspect of the invention, a method of reducing or eliminating common mode noise in a power converter including an inductor and a switch is provided comprising steps of configuring the inductor as first and second inversely coupled windings connected at a center tap and having different numbers of turns, connecting a capacitor to the center tap, and connecting the combination of the inductor and capacitor to a terminal of the switch.

BRIEF DESCRIPTION OF THE DRAWINGS

The foregoing and other objects, aspects and advantages will be better understood from the following detailed description of a preferred embodiment of the invention with reference to the drawings, in which:

FIG. 10 illustrates cancellation of capacitance $C_a$ to eliminate CM noise, FIGS. 11 and 12 schematically illustrate cancellation of capacitance with non-ideal coupling of windings.

DETAILED DESCRIPTION OF A PREFERRED EMBODIMENT OF THE INVENTION

Figure 1:
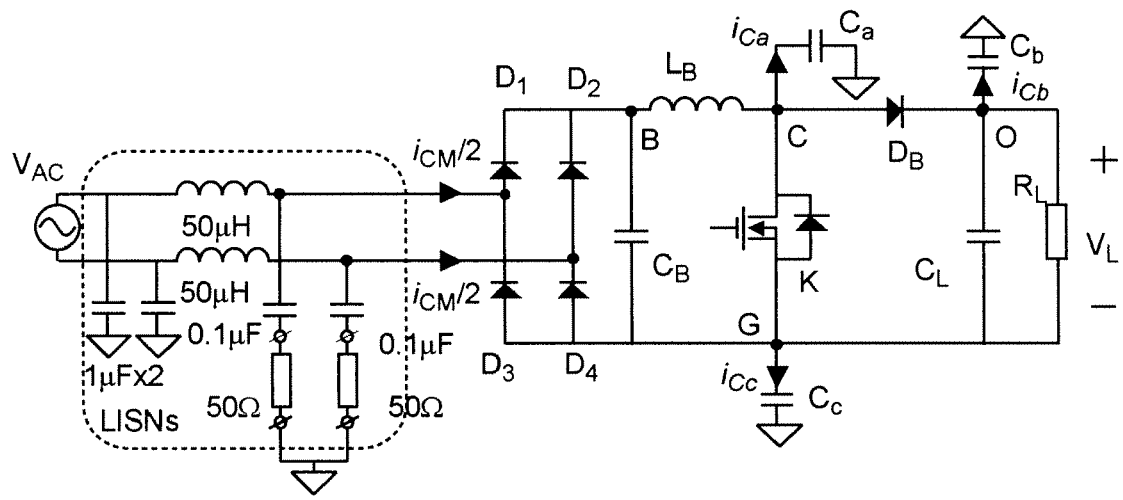
FIG. 1 is a schematic diagram of a setup for EMI measurement.

Referring now to the drawings, and more particularly to FIG. 1, there is shown a setup for EMI measurement. While arrangements for performing such a function are known and the invention is not embodied in FIG. 1, no admission is made that any portion of FIG. 1 or any other Figure constitutes prior art in regard to the present invention. Therefore, Figures which do not include the invention have been designated "Related Art".

In power electronics, the conducted common mode (CM) noise generated from front-end converters, in particular, is an important concern for electromagnetic interference (EMI) suppression. There are numerous national and international standards specifying noise limits for power electronics circuits. The typical way to meet such standards is to use one or two stages of CM EMI filters; introducing extra cost and increasing the size of the systems. As alluded to above, the parasitic capacitance of various nodes of a power converter circuit and ground is a principal cause of CM noise.

Power factor correction (PFC) circuits which guarantee unit power factor and low harmonics of power lines are generally located in the front side of power systems. The CM noise generated by the PFC circuit is usually the major part of the measured CM noise on the power line side and FIG. 1 illustrates a suitable setup for CM noise measurement of an exemplary boost PFC converter (chosen for purposes of the following discussion since boost converters are the most commonly used topology for front-end converters). In FIG. 1, two line input stabilization networks (LISNs) which are terminated by two 50Ω input impedances of a noise separator are used to measure CM noise. Since the CM noise is principally generated by the noise current flowing through the parasitic capacitances due to the node voltage potential variation, dv/dt, the voltages on nodes B, C, O and G are of interest and importance to an understanding of the invention.

In FIG. 1, $C_a$ is the parasitic capacitance between node C and ground and is composed of two parts. The first part is the parasitic capacitance between the drain of the main switch, K, and ground. The second part is the parasitic capacitance between the printed circuit board (PCB) traces and ground. $C_b$ includes the parasitic capacitance between the cathode of diode $D_B$ and ground and between the load and ground. $C_c$ includes the parasitic capacitance between the PCB and ground and the load and ground.

During operation of the PFC circuit of FIG. 1, the voltages at nodes B, C and O are varying when the active switch K turns on and off. The voltage potential of node G is the same as one of the two power lines because of the conduction of the diode bridge, D1, D2, D3 and D4, and is therefore consider constant for purposes of noise analysis. Accordingly, $C_a$ and $C_b$ are of principal importance to an understanding of the principles of the invention. Construction of a noise model for a boost PFC converter and the effects of $C_a$ and $C_b$ will be identified. A technique for cancellation of $C_a$ will then be demonstrated and verified.

Figure 2:
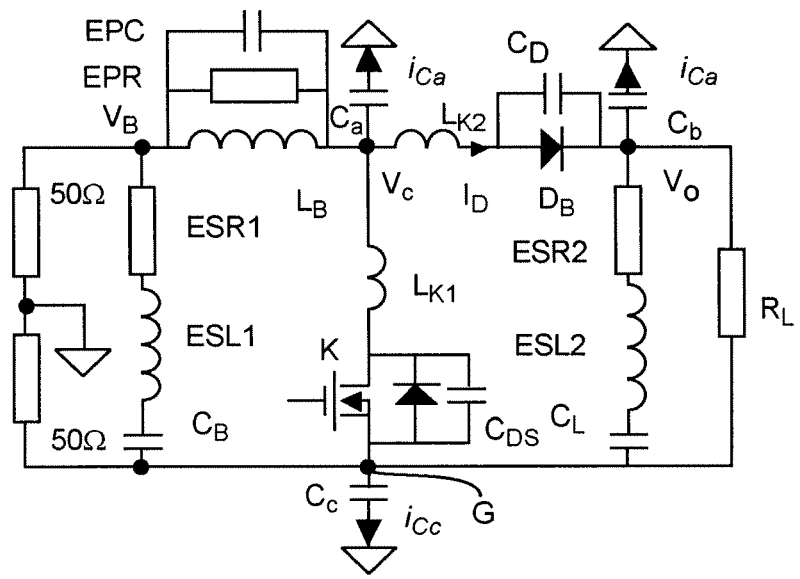
FIG. 2 is a schematic diagram modeling parasitic capacitance for a boost power factor correction (PFC) circuit, FIG. 3, graphically illustrates voltage and current waveforms in the circuit model of FIG. 2, FIGS. 4, 5 and 6 illustrate circuit schematics of circuit transformations useful in conveying an understanding of the invention.
Figure 3:
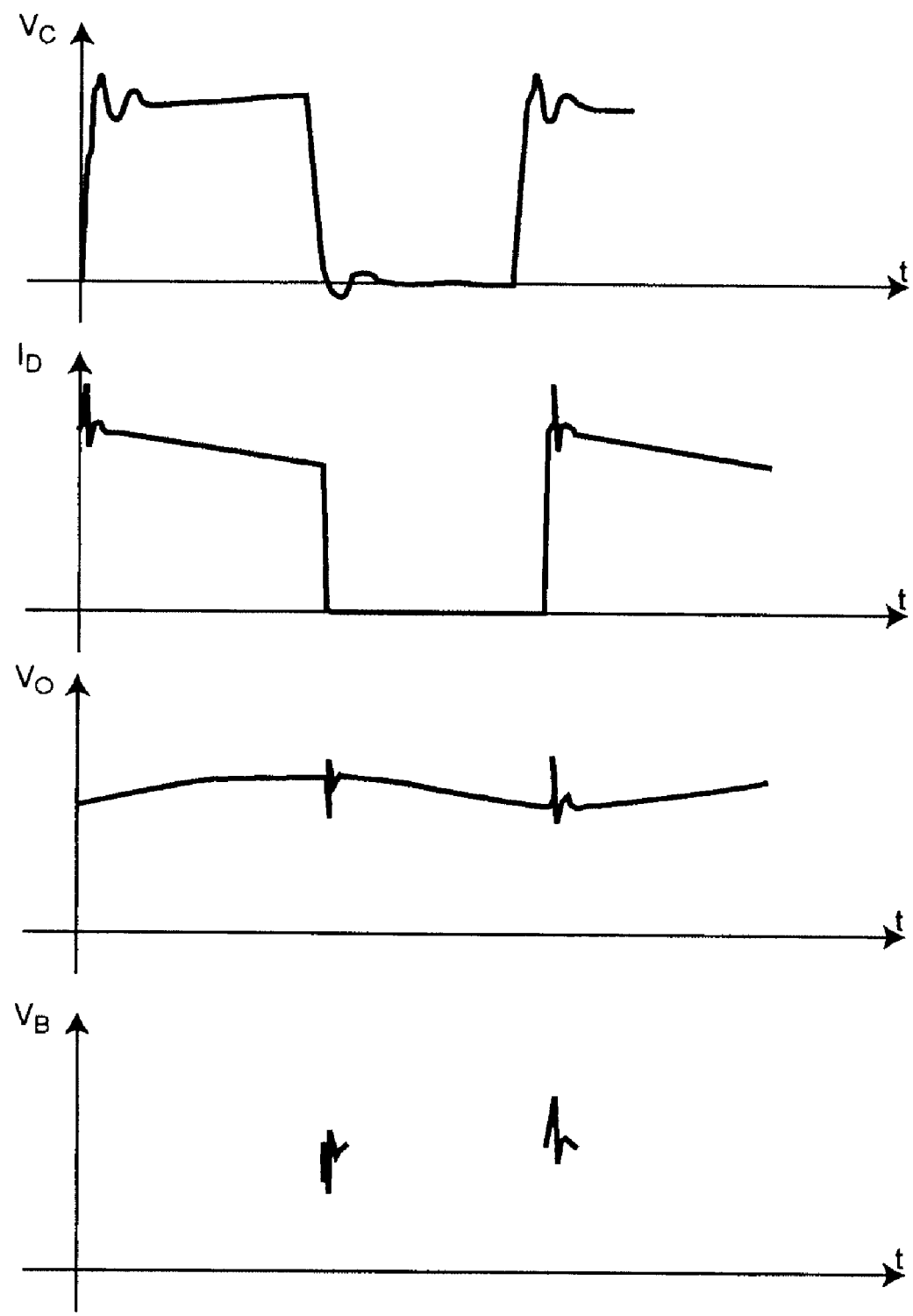

CM Noise Model:

FIG. 2 shows the parasitics for an exemplary boost PFC circuit, omitting some parasitics of lesser effect shown in FIG. 1. The effects of the diode bridge circuit is ignored in FIG. 2 and the two LISNs are represented by two 50Ω resistors but the parasitics of the components and the PCB traces are included in the model. The voltage waveforms for nodes B, C and O and the current waveform for the diode DB branch (using node G as a reference) are shown in FIG. 3.

Figure 4:
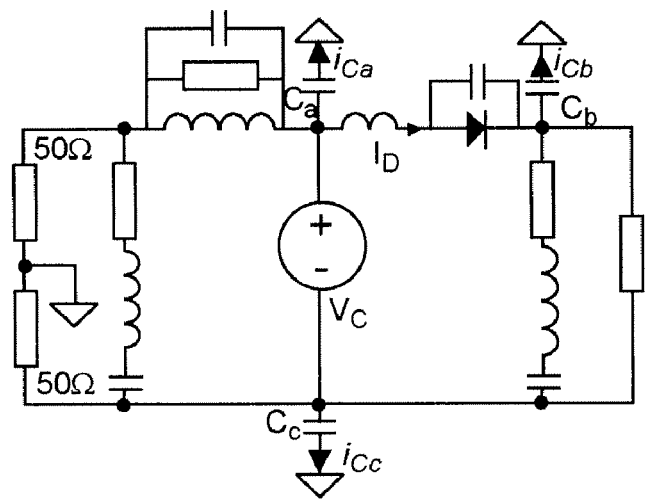
Figure 5:
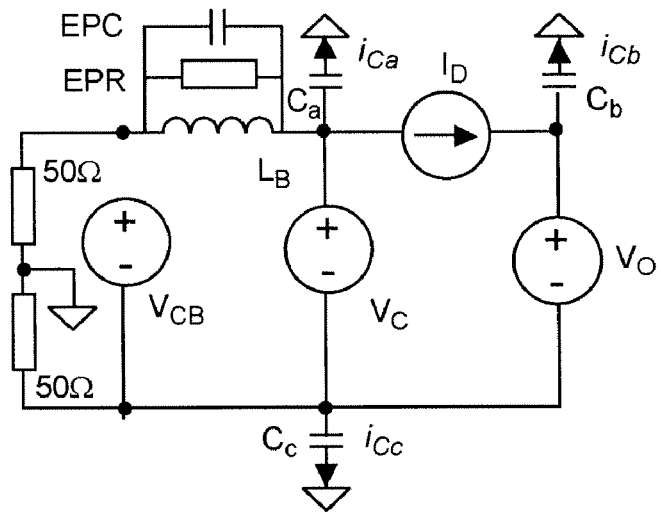

In FIG. 2, the switch K, represented by an exemplary MOSFET and diode $D_B$ are non-linear components, which make EMI noise analysis difficult since they must be modeled both correctly and conveniently for noise analysis. According to network theory, if the main switch branch were to be replaced by a voltage source, the waveform of which is identical to $C_c$ of FIG. 3, the resultant circuit, illustrated in FIG. 4 would have exactly the same properties as the circuit of FIG. 2 since the voltages and currents of all branches are maintained intact. Following the same logic, the branches of diode $D_B$ and output can also be replaced by current and voltage sources which have the same waveforms as shown in FIG. 3; yielding the noise model illustrated in FIG. 5.

The total CM noise is the total of effects of all these voltage and current noise sources. According to the superposition theorem, the CM noise generated by each of theses sources can be analyzed separately. That is, CM noise generated by a given noise source can be analyzed by replacing other noise sources by a short circuit and other current sources by an open circuit. Thus, the CM noise $V_C$ generated by the main switch K can therefore be analyzed using the model illustrated in FIG. 6. Incidentally, the current source $I_D$ does not contribute to the CM noise since it is shorted by $V_C$ and $V_O$ as is seen to be reasonable because the voltages on nodes C and O are already determined by voltage sources $V_C$ and $V_O$.

Figure 6:
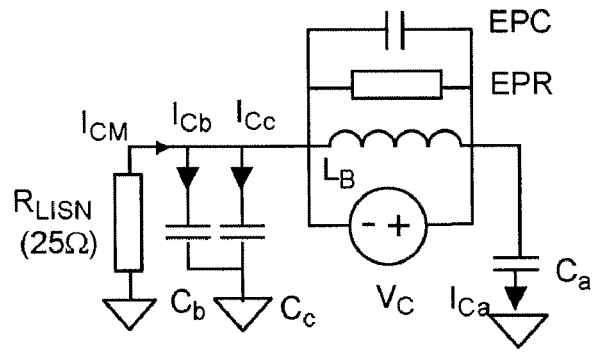

Because the main switch K typically switches a relatively high voltage such as 400 volts, the amplitude of the noise source is equally large and, since switching is performed very rapidly, dv/dt is very significant. As a result, $V_C$ is the most important noise source. Noise sources $V_{CB}$ and $V_O$ also contribute to the total CM noise but are not as significant. FIG. 6 shows that $C_b$ and $C_c$ are in parallel with the LISNs and do not cause noise problems. Thus $C_a$ is the critical capacitance for the CM noise generated by $V_C$.

In order to reduce CM noise, $C_a$ should be as small as possible. However, as alluded to above, the main switch consumes substantial power and a large heat sink is invariably needed which may or may not be grounded, depending on the application. Therefore, the capacitance, $C_a$, between the drain of switch K, such as a MOSFET, and the heat sink is significant and very difficult to reduce.

Figure 7:
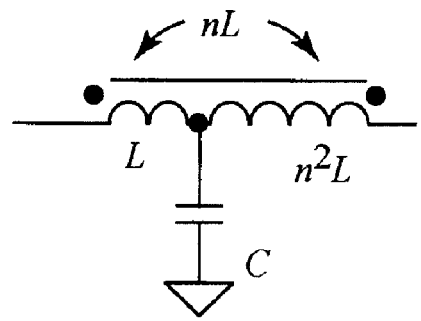
FIGS. 7, 8 and 9 illustrate coupled and decoupled windings for cancellation of capacitance in accordance with the invention.

In accordance with the invention, two inversely coupled windings are used to substantially cancel the CM parasitic capacitance $C_a$. As shown in FIG. 7, an inductor is provided having two inversely coupled windings and a capacitance C connected to the center tap. For purposes of this discussion, it is assumed that the windings have a coupling ratio of one and a turn ratio of n where N is not equal to one (which would null the total inductance.). Thus, if one winding has an inductance L, the other will have an inductance $N^2L$ and the mutual inductance of the two windings is therefore nL.

Figure 8:
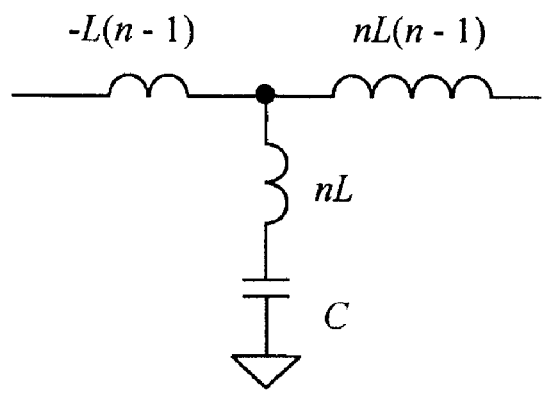
Figure 9:
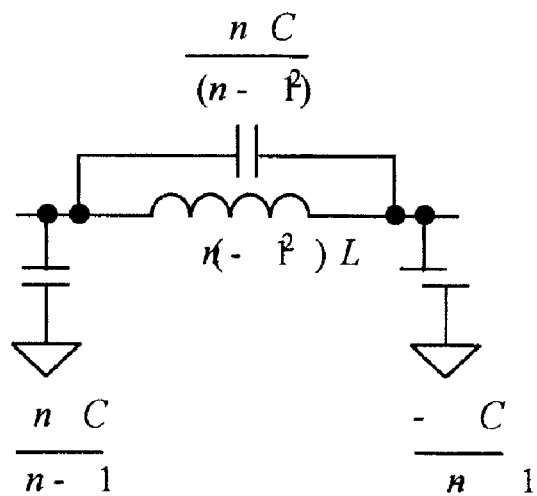

The two inductors can be decoupled using network theory to result in the circuit shown in FIG. 8 and, using, a Y–Δ transformation, an equivalent circuit is shown in FIG. 9. In FIG. 9, the effects of the capacitor (e.g. of FIG. 7) are represented by three capacitors: one in parallel with the inductor and two shunt capacitors on opposite sides of the inductor. Thus, $$n \neq 1 \qquad (1)$$

-continued $$n > 1 \Rightarrow \begin{cases} \dfrac{nC}{n-1} > 0 \\ \dfrac{-C}{n-1} < 0 \end{cases} \quad (2)$$

$$n < 1 \Rightarrow \begin{cases} \dfrac{nC}{n-1} < 0 \\ \dfrac{-C}{n-1} > 0 \end{cases} \quad (3)$$

As can be seen from equations (2) and (3), depending on the value of n, the two capacitors on opposite sides of the inductor can be positive and negative with the negative capacitance always being on the side of the winding with a greater number of turns. Applying this technique to $L_B$ in FIG. 6, the negative capacitance may be used to cancel $C_a$, as shown in FIG. 10. In FIG. 10, turn ratio n should be larger than one in order to generate a negative capacitance to cancel $C_a$. The total inductance $(n-1)^2 L$ after applying cancellation should be equal to the desired boost inductance $L_B$, and thus L is given by equation (4), below. It is preferred that n>>1 to reduce the size of the inductor. The value of C needed to cancel $C_a$ is given by equation (5), below.

$$L = \frac{L_B}{(n-1)^2} \quad (4)$$

$$C = (n-1)C_a \quad (5)$$

The above analysis assumes that the two windings in FIG. 7 are ideally coupled but, in practice, the coupling coefficient is always smaller than one (usually between 0.9 and 1.0 for a boost inductor), especially at high frequencies where the permeability of a magnetic core is reduced. Accordingly, an analysis similar to that above but for non-ideal coupling of windings will now be provided.

Referring now to FIG. 11, if the coupling coefficient G is less than one, the windings can still be decoupled using network theory as above. Using a Y–Δ transformation, as above, the equivalent circuit of FIG. 12 is obtained, and $$Z_{EQ} = \frac{n^2 L^2 s^2 (1-g^2) + \dfrac{L}{C}(1+n^2-2gn)}{gnLs + \dfrac{1}{sC}} \quad (6)$$

Due to the non-ideal coupling between two windings, there is an equivalent negative or positive inductance appearing on each side depending on the value of turn ratio n. These inductances are in series with the desired negative capacitances and which compromises parasitic capacitance cancellation at certain frequencies. That is, in FIG. 12, it is illustrated that the non-ideal coupling introduces a positive or negative inductance in series with the original two capacitances in FIG. 9, respectively. At low frequencies, the impedance of positive or negative capacitance still dominates the impedance of two branches and the cancellation works well. At high frequencies, the impedance of positive or negative inductance dominates the impedance of the two branches and the cancellation is much less effective. The corner frequency $\omega_C$ between the capacitance dominant and inductance dominant frequency ranges is given by equation (7).

$$\omega_C = \frac{\sqrt{1 + \dfrac{(gn-1)^2}{n^2(1-g^2)}}}{\sqrt{LC}} \quad (7)$$

Considering that the coupling coefficient is typically between 0.9 ans 1.0 and n is preferably much larger than one, from equations (4), (5) and (7), $\omega_c$ can be simplified to $$\omega_C = \frac{\sqrt{n-1}}{\sqrt{L_B C_a (1-g^2)}} \quad (8)$$

and should be as large as possible in order to maximize the frequency range where parasitic capacitance cancellation is effective. From Equation (8), the larger turn ratio n is good for cancellation since the coupling coefficient is usually between 0.8 and 1.0.

Figure 13A:
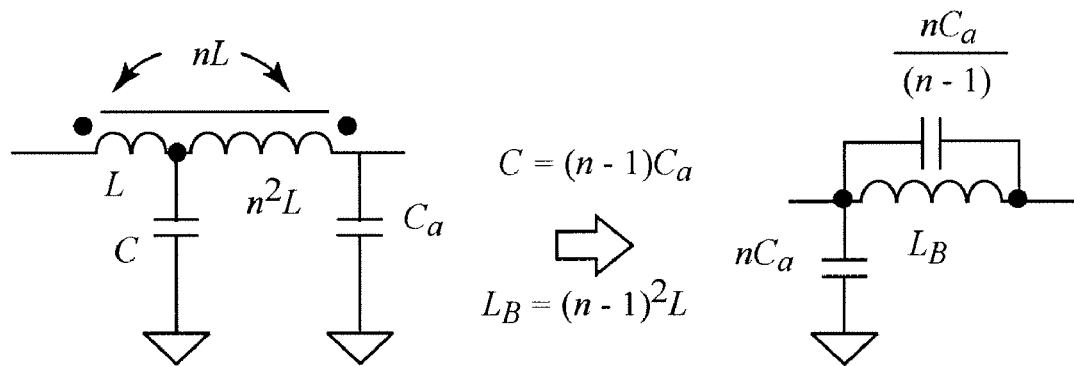
FIGS. 13A and 13B illustrate variant forms of the invention when the heat sink is and is not grounded, respectively, FIG. 14 schematically illustrates a measurement setup for parasitic capacitance cancellation, and FIGS. 15A, 15B and 16 graphically illustrate the effects of the inventions for grounded and ungrounded heat sinks, respectively.
Figure 13B:
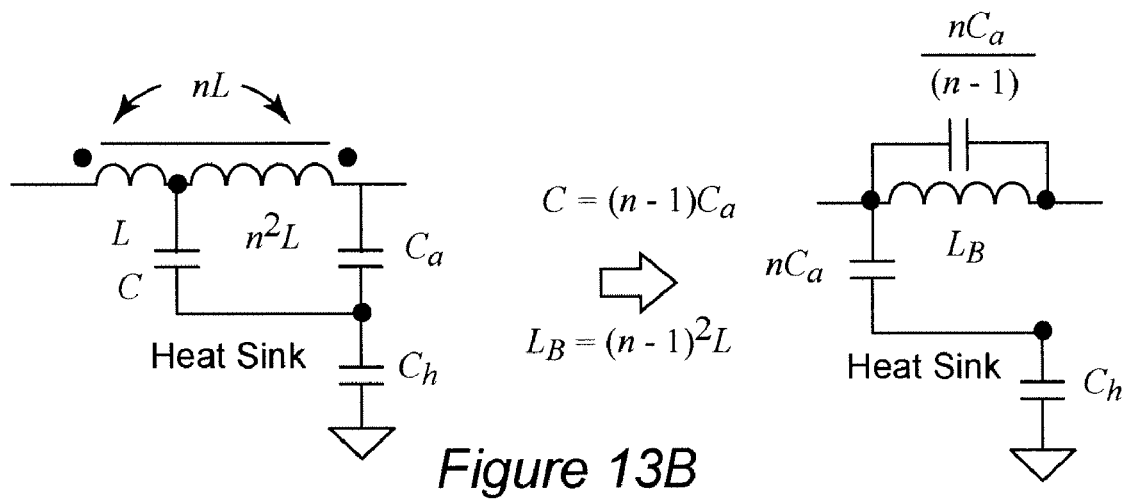

In a practical PFC converter, since the heat sink may or may not be grounded, there are two implementations of the invention to be considered. If the heat sink is grounded, $C_a$ is the parasitic capacitance between the drain of MOSFET main switch K and the heat sink. In this case, the cancellation capacitor should be simply connected directly to the (grounded) heat sink as shown in FIG. 13A. For the case where the heat sink is not grounded, there is a parasitic capacitance $C_a$ between the drain of the MOSFET main switch K and and further parasitic capacitance $C_h$ between the heat sink and ground as shown in FIG. 13B. The effects of $C_a$ can still be canceled as long as the cancellation capacitor is connected to the heat sink because the resultant capacitance $nC_a$ is in series with capacitance $C_h$ and they are connected to the input of the converter. The input of the converter is considered as having a constant potential to EMI noise since it is connected to the power source. As a result, there is no CM noise flowing through these capacitances. Thus, when $C_a$ is canceled, the CM noise is eliminated.

The effectiveness of the invention to provide parasitic capacitance cancellation has been verified experimentally. In these experiments, the PFC circuit has an output power of 650 Watts, the switching frequency is 67 KHz and the inductor has an inductance of about 860 μH using a commercially available ("kool μ") toroidal core. The PCB, main switch and diode $D_b$ are mounted on a heat sink. Switch K is constituted by two MOSFETs in parallel to handle high current. The heat sink is grounded. As alluded to above, $C_a$ is composed of two parts as illustrated in the measurement setup shown in FIG. 14: one being the parasitic capacitance $C_{a2}$ between the drain of the MOSFET and the heat sink and the second being the parasitic capacitance $C_{a1}$ between the PCB traces and the heat sink.

Three experiments are carried out. In the first experiment, the CM noise is measure without cancellation. The measured CM noise from 150 KHz to 30 MHZ is shown in FIGS. 15A and 15B.

In the second experiment, the cancellation is applied to the inductor. One winding of the inductor has two turns and the inversely or opposingly coupled winding has fifty five turns (turns ratio=27.5:1). The CM noise measurement shows that the best cancellation capacitance is 920 pF. According to equation (5), $C_{a1}+C_{a2}$ should be 34.7pF. The measured $C_{a2}$ is 26.6 pF, so $C_{a2}$ should be 8.1 pF. The measured CM noise is compared with the original (without cancellation) CM noise in FIGS. 15A and 15B and it is seen that there is a 26 db (a factor of twenty) noise reduction from 150 KHz to 2 MHZ. From 2 MHZ to 15 MHZ there is still a 0-26 db noise reduction and the noise reduction is, as predicted in the above discussion, not as good as the low frequency range and (without wishing to be bound by the above theory and analysis) is possibly attributable to the non-ideal coupling between windings. Further, the cancellation as implemented for the experiment can only cancel the CM noise attributable to $V_C$ but not $V_{CB}$ and $V_O$. The CM noise generated by auxiliary switching power converters also contributes to the total CM noise but cannot be canceled. From 15 MHZ to 30 MHZ, the CM noise is slightly greater than without the cancellation which may be due to unknown parasitics resonating with the introduced cancellation components. This experiment also shows little variation in CM noise as the cancellation capacitance is varied between 900 pF and 960 pF indicating that the invention is relatively insensitive to variation or accurate matching of the cancellation capacitance to the parasitic capacitance to be canceled.

In the third experiment, which is similar to the second but for the turns ratio, one winding of the inductance has one turn while the oppositely coupled winding has fifty-five turns, as before. The CM noise measurement shows that the best cancellation is obtained with a cancellation capacitance of about 1856 pF. According to equation (5), $C_{a1}+C_{a2}$ should be 34.4 pF. Again, the measured $C_{a2}$ is 26.6 pF and thus the parasitic capacitance between the PCB traces and the heat sink should be 7.8 pF which is closely in accord with the results of the second experiment described above.

Figure 15B:
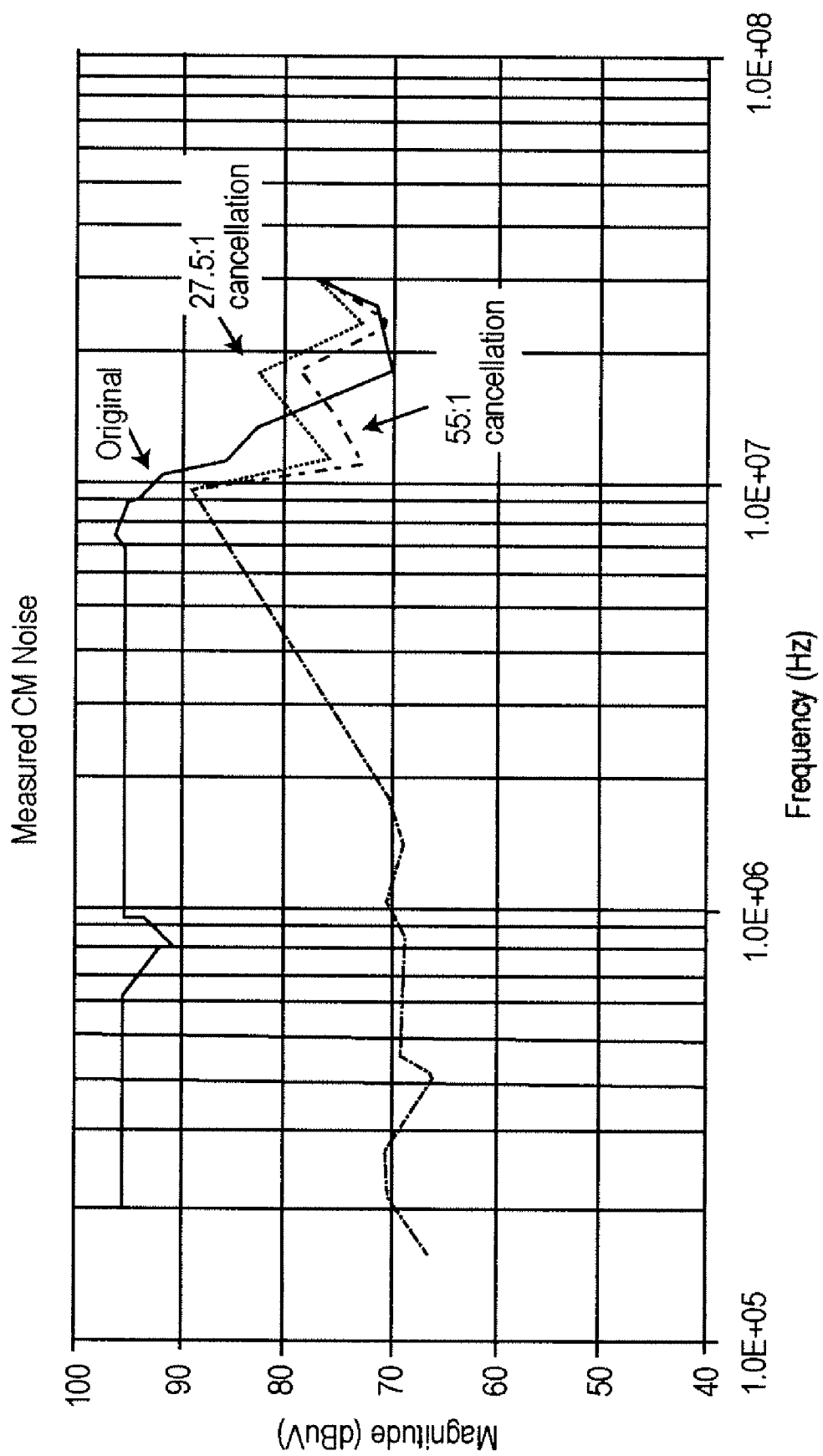

The measured CM noise is again compared with CM noise in the first two experiments and illustrated in FIGS. 15A and 15B. It is evident from this comparison that the low frequency improvement is similar to that of the second experiment but there is an improvement by several db from 15 MHZ to 30 MHz which (without wishing to be held to any particular theory) can be explained by the above analysis. Also, in a manner similar to the second experiment, there is little variation in CM noise reduction as the cancellation capacitance is varied from 1800 pF to 1900 pF; indicating that insensitivity to precise matching of the cancellation capacitance to the parasitic capacitance is maintained at a higher turns ratio of the inductor windings.

The first and third experiments have also been conducted with the heat sink disconnected from ground and the results illustrated in FIG. 16. The results are clearly similar to those illustrated in FIGS. 15A and 15B and the analysis and embodiment applicable to the case where the heat sink is ungrounded is thus similarly verified.

In view of the foregoing, it is seen that the invention provides a technique and circuit for developing a negative capacitance in conjunction with an inductor in a power converter which can be fabricated at much smaller size and reduced cost in comparison with known EMI filters and which can reduce or eliminate CM noise in a switched power converter with high effectiveness. Since the negative capacitance can be developed in conjunction with any inductor, the invention is thus applicable to any power converter or regulator topology such as buck, boost-buck, forward, half-bridge, flyback, etc. power conversion topologies, to power converters in which an inductor is present and connected to a node exhibiting high dv/dt or in which an inductor can be placed, such as in an output circuit thereof as a filter or the like. The inductor with oppositely coupled windings and the cancellation capacitor can be implemented in practical PFC converters with very little, if any, increase in size or footprint on the PCB or increase in cost (particularly in comparison with EMI filters which are usually electrically located between the power lines and the PFC converter) since the invention can be implemented at much smaller size and footprint than an EMI filter and in consideration of the fact that the invention exploits an inductor generally present in power converter topologies and that the cancellation capacitance is generally much smaller than the capacitance(s) required in EMI filters. The corner frequency, where the noise cancellation in accordance with the invention may be compromised by non-ideal coupling is also significantly increased in comparison with practical EMI filters, largely due to the much lower CM noise at low frequencies. Additionally, the invention can be used in combination with EMI filters to further reduce noise; allowing reduction of values of inductance(s) and capacitance(s) to be used and which can efficiently operate at higher frequencies since the parasitics are smaller.

The invention, while explained above in connection with a front-end power converter, can also be applied to the cancellation of parasitic capacitance at the output of a power converter since there are power diodes or MOSFETs on the secondary side of converters. Further, the concept and basic principles of the invention can be extended to cancel any capacitance such as the junction capacitance of MOSFETs or diodes or the like as long as the cancellation capacitance is connected to such a related device. Any such application of the invention provides the additional benefits of reduced power loss and increased switching speed of the device.

While the invention has been described in terms of a single preferred embodiment, those skilled in the art will recognize that the invention can be practiced with modification within the spirit and scope of the appended claims.

We claim

1. A circuit for providing a negative capacitance comprising
    an inductor having first and second inversely coupled windings connected at a tap, said first and second windings having different numbers of turns, and
    a capacitor connected to said tap,
    whereby a negative capacitance is developed at a terminal of said inductor connected to a winding of said first and second windings having a greater number of turns.

2. The circuit as recited in claim 1 in combination with a switching device connected to said first or second winding having a greater number of turns.

3. The circuit as recited in claim 2 wherein the switching device has a parasitic capacitance to a heat sink or ground.

4. A power converter including an inductor and a switch, wherein
    said inductor includes first and second inversely coupled windings connected at a tap, said first and second windings having different numbers of turns, said power converter further including
    a capacitor connected to said center tap,
    said combination of said inductor and said capacitor providing a negative capacitance and being connected for cancellation of parasitic capacitance and being connected for said switch for providing substantial cancellation of common mode noise.

5. The power converter as recited in claim 4, wherein said switch is attached to a heat sink.

6. The power converter as recited in claim 5, wherein said heat sink is grounded.

7. The power converter as recited in claim 5, wherein said heat sink is grounded.

8. The power converter as recited in claim 4 wherein said power converter has a boost converter topology.

9. A method of reducing or cancelling parasitic capacitance and eliminating common mode noise in a power converter including an inductor and a switch, said method comprising steps of configuring said inductor as first and second inversely coupled windings connected at a tap, said first and second windings having different numbers of turns, connecting a capacitor to said tap to form a combination of said inductor and said capacitor, and connecting said combination of said inductor and said capacitor to a terminal of said switch and to a heat sink for substantial cancellation of common mode noise.

10. The method as recited in claim 9, wherein said heat sink is grounded.

11. The method as recited in claim 9, wherein said heat sink is not grounded.

* * * * *